(No Model.) 4 Sheets—Sheet 1.

W. A. McI. VALON.
STOP MOTION REGISTER FOR GAS METERS.

No. 438,451. Patented Oct. 14, 1890.

WITNESSES. INVENTOR.

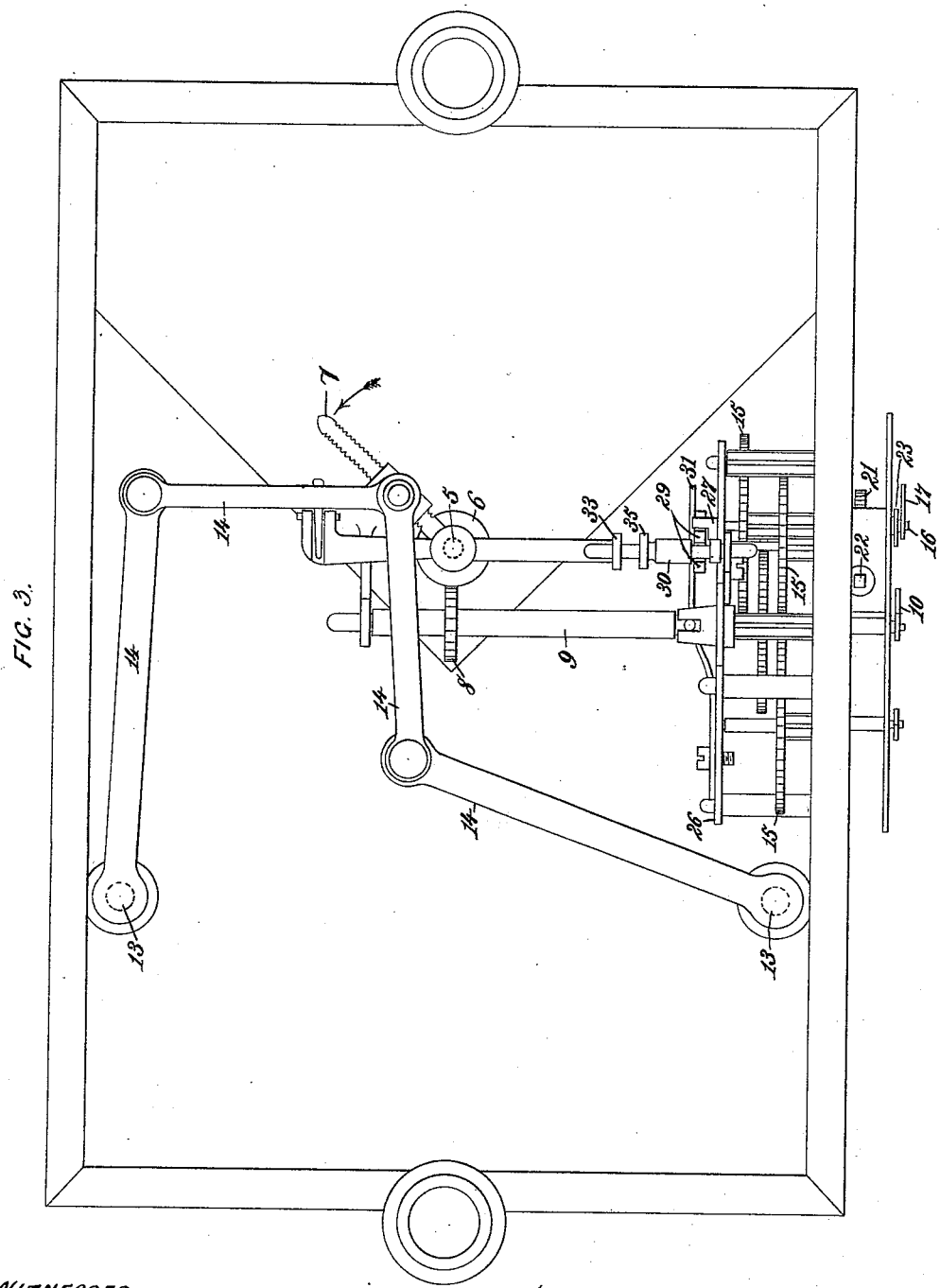

(No Model.)
W. A. McI. VALON.
STOP MOTION REGISTER FOR GAS METERS.
No. 438,451. Patented Oct. 14, 1890.
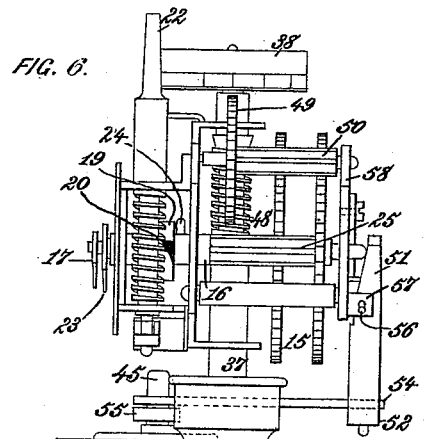
FIG. 6.
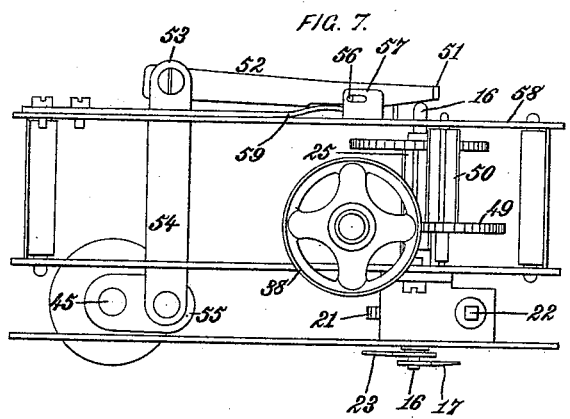
FIG. 7.
FIG. 4.
WITNESSES.
INVENTOR.

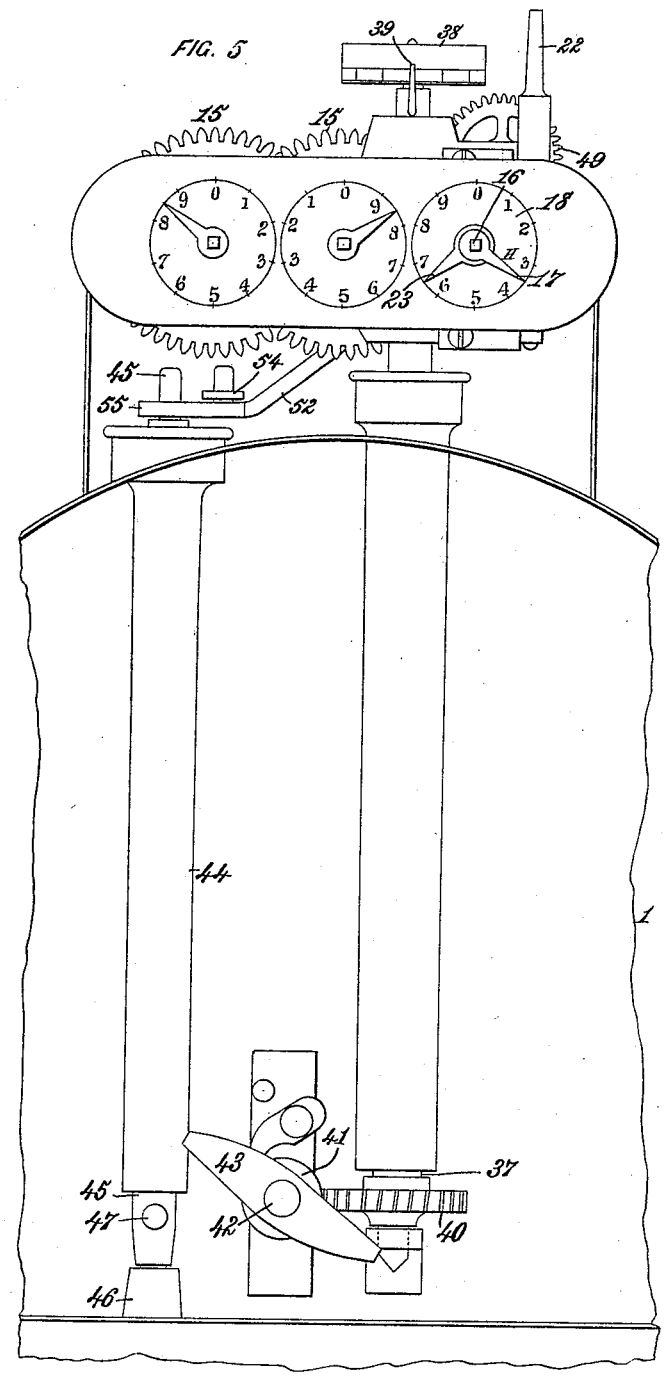

UNITED STATES PATENT OFFICE.

WILLIAM ANDREW McINTOSH VALON, OF RAMSGATE, ENGLAND.

STOP-MOTION REGISTER FOR GAS-METERS.

SPECIFICATION forming part of Letters Patent No. 438,451, dated October 14, 1890.

Application filed January 9, 1890. Serial No. 336,432. (No model.) Patented in England July 1, 1889, No. 10,598, September 11, 1889, No. 14,312, and November 21, 1889, No. 18,641.

*To all whom it may concern:*

Be it known that I, WILLIAM ANDREW MCINTOSH VALON, a subject of the Queen of Great Britain, residing at Ramsgate, in the county of Kent, England, have invented certain new and useful Improvements in Stop-Motion Registers for Gas-Meters, (for which I have obtained Letters Patent in Great Britain No. 10,598, dated July 1, 1889; No. 14,312, dated September 11, 1889, and No. 18,641, dated November 21, 1889,) of which the following is a full, clear, and exact specification.

This invention relates to the index mechanism of a dry or wet gas-meter, and has for its object to provide novel means for automatically stopping the action of the meter and index mechanism and cutting off the supply of gas to the gas-fixtures in the building when a predetermined quantity of gas has passed through the meter.

To accomplish this object my invention involves the features of construction, the combination or arrangement of devices, and the principles of operation hereinafter described and claimed, reference being made to the accompanying drawings, in which—

Figure 1:
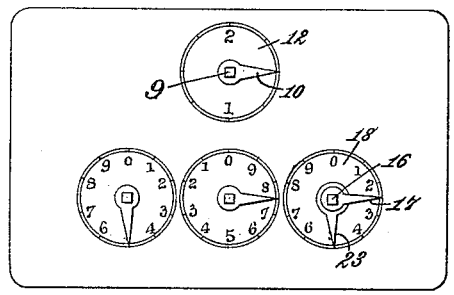
Figure 2:
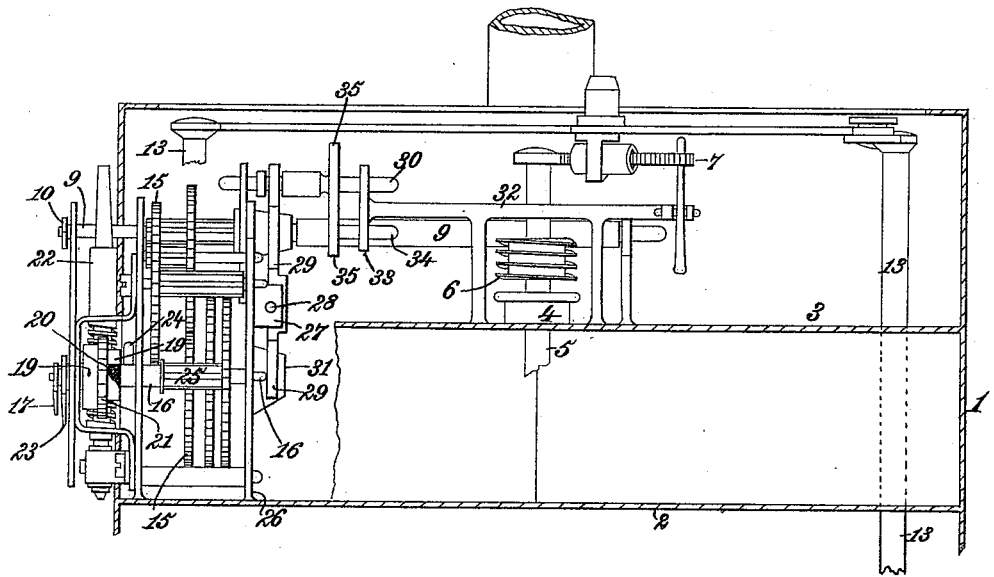

Figure 1 is a front elevation of the usual dial-plate in a dry meter. Fig. 2 is a broken sectional view of the upper end of a dry meter embodying my invention. Fig. 3 is a top plan view of the same. Fig. 4 is a detail view showing a modification of the clutch for effecting the automatic stoppage of the meter and index mechanism. Fig. 5 is a broken front elevation showing a portion of a wet meter embodying my invention. Fig. 6 is a sectional side elevation of the same. Fig. 7 is a detail top plan view showing a portion of the index mechanism of the wet meter.

In order to enable those skilled in the art to make and use my invention, I will now describe the same in detail, referring first to Figs. 1, 2, and 3, wherein the numeral 1 indicates the external casing of a dry gas-meter; 2, the horizontal partition in the upper portion thereof; 3, the top of the valve-box; 4, the stuffing-box; 5, the upright spindle, having a worm 6 and carrying the tangent-screw 7; and 8 a worm-wheel on the spindle 9, which carries the pointer 10 of the fraction-dial 12.

The flag-rods 13 of the bellows or like mechanism connect by levers 14 with the tangent-screw 7 in such manner that the action of the bellows or like mechanism causes the tangent-screw to revolve in the direction of the arrow on Fig. 3. These features, as well as the train of gearing 15 of the index mechanism, are of the well-known construction common in this type of dry meter, and therefore I do not consider it essential to more fully describe and illustrate the same.

The spindle 16, carrying the register-pointer 17 of the hundreds-dial 18, Fig. 1, is adapted to slide lengthwise and is provided with a loose disk 19, having a beveled notch 20, the form of which is indicated in deep black, Fig. 2. The disk is secured to a worm-wheel 21, engaging the worm-shaft 22, and by rotating the worm-shaft by a suitable key the disk is turned on the pointer-carrying spindle 16, and the adjustable pointer 23 is thereby turned over the dial 18 to the desired position, such adjustable pointer 23 being connected with the disk 19 to rotate therewith. A lateral pin 24, fixed to the spindle 16, coacts with the notched disk 19 to form a clutch, and secured to the spindle 16 is a pinion 25, driven by the train of gearing 15, comprising the index mechanism.

To the back plate 26 of the index mechanism is secured a bracket or support 27, to which is pivoted, as at 28, an oscillatory lever 29. The lower end of the lever rests against the inner end of the lengthwise-sliding pointer-carrying spindle 16, and the upper end of the oscillatory lever is forked and embraces a horizontally-sliding rod or arm 30.

The lower end of the lever 29 is pressed upon by a leaf or other suitable spring 31, the tendency of which is to force the spindle 16 outwardly in such manner that when its pin 24 coincides with the notch 20 the pin will enter such notch.

A bar or frame 32, supported by the valve-box 3 or otherwise, carries a guide 33, in which moves lengthwise a pin 34, secured to a yoke or cross-head 35, rigidly mounted on the rod or arm 30.

In consequence of the peculiar arrangement described when the registering-pointer 17 corresponds in position with the adjustable pointer 23 the beveled notch 20 and the lateral pin 24 will be in coincidence, whereupon the spring 31 will cause the lower end of the lever 29 to throw the spindle 16 lengthwise in an outward direction, thereby causing the pin 24 to enter the notch 20. At the same instant the upper end of the lever 29 will be thrown inward, which slides the rod or arm 30 inward, and with it the yoke or cross-head 35, to place the latter in the path of the revolving tangent-screw 7, thereby stopping such screw, and consequently stopping the action of the meter and its index mechanism.

To reset the adjustable pointer 23, a key is applied to the worm-shaft 22, and by turning it the worm 21 and disk 19 are rotated, and hence the beveled wall or edge of the notch 20 will act on the pin 24 to move it out of the notch and place such pin against the rear side of the disk, as shown in Fig. 2. It will be obvious that the backward motion of the pin produced by the beveled edge of the notch 20 will slide the spindle 16 rearward, and thereby rock the lever 29 and relieve the tangent-screw from the restraining action of the yoke or cross-head 35, whereupon the meter will commence action.

In the modified construction of clutch shown in Fig. 4 the clutch-pin 24 is secured to the loose disk 19 and the beveled notch 20 is formed in a collar 36, attached to the lengthwise-moving pointer-carrying spindle 16.

In Figs. 5, 6, and 7 I exhibit my invention as applied to a wet meter, and referring to these figures the numeral 1 indicates the casing of the meter, 37 the spindle, which carries a rotary fraction-dial 38 for the pointer 39, and 40 indicates a worm-wheel carried by the spindle 37 and engaging a worm 41, Fig. 5, on the rotary drum or bucket shaft 42 of the meter. These parts, as well as the train of gearing 15 of the index mechanism, are well known, and therefore are not more fully described and illustrated.

The drum or bucket shaft 42 is provided with a cross-head or cam 43, and in a sealed tube 44 is adapted to axially oscillate a vertical rod or shaft 45, having its lower end portion mounted in a step 46, and provided with a lateral pin or stud 47 in such manner that when the rod or shaft 45 is turned in one direction its pin or stud 47 is placed in the path of the cross-head or cam 43, thereby stopping the latter, and consequently stopping the rotation of the meter-bucket and the action of the index mechanism.

The spindle 37 carries a worm 48, Fig. 6, which engages a worm-wheel 49, having its shaft provided with a pinion 50, by which motion is transmitted through suitable gearing to the pinion 25 on the lengthwise-movable spindle 16. This spindle carries the registering-pointer 17 for the hundreds-dial 18, and the loose disk 19, having the pin 24 and mounted on the spindle 16, carries the adjustable pointer 23, as hereinbefore explained with reference to Figs. 1, 2, and 3. The rear end of the pointer-carrying spindle rests against the upwardly-turned end 51 of an oscillating lever 52, which is pivoted at 53 to a link 54, connected with a crank-arm 55 on the upper end of the rod or shaft 45. The lever 52 is loosely pivoted, as at 56, to a lug or support 57 on the back plate 58 of the index mechanism, and to said back plate is also attached a leaf-spring 59, having its free end bearing against the lever 52.

The adjustable pointer 23 is moved into the desired position by applying a key to and turning the worm-shaft 22, which rotates the worm 21 and the notched disk 19, thereby causing the clutch-pin 24 to move out of the notch 20 and the spindle 16 to slide inwardly and swing the lever 52 on its pivot 56. This movement operates the link 54 and crank-arm 55 to turn the rod or shaft 45 and move the pin or stud 47 from the path of the cross-head or cam 43, whereupon the drum or bucket-shaft 42 is free to revolve to pass gas through the meter and operate the index mechanism. When the meter has passed so much gas as will place the registering-pointer 17 into coincidence with the adjustable pointer 23, the clutch-pin 24 will be in coincidence or alignment with the beveled notch 20, and the lever 52, under the influence of the spring 59, will throw the spindle 16 forward, and thereby cause the pin 24 to enter the notch 20, in consequence of which the link 54 will be drawn rearward and the crank-arm 55 actuated to turn the rod or shaft 45, whereby the pin or stud 47 will be placed in the path of the cross-head or cam 43 to stop the rotation of the drum or bucket-shaft 42.

The modified form of clutch exhibited in Fig. 4 can be adopted in the index mechanism for the wet meter, as well as for the dry meter.

By the means described the index mechanism is operated from the interior of the meter, and I provide a clutch mechanism for automatically stopping the meter and index mechanism after any predetermined quantity of gas has passed through the meter, thereby cutting off further supply of gas to the fixtures in the building until the clutch mechanism is reset.

Having thus described my invention, what I claim is—

1. The combination, with index mechanism operated from the interior of a gas-meter, of a rotary lengthwise-movable spindle carrying a pointer, a disk loose on the spindle and connected with a pointer, a clutch between the spindle and disk, composed of a pin and notch, means for automatically stopping the action of the meter and the index mechanism by the engagement of the pin and notch, and a key-shaft for disengaging the pin and notch to start the meter and index mechanism, substantially as described.

2. The combination, with index mechanism operated from the interior of a gas-meter, of a rotary lengthwise-movable pointer-carrying spindle, a disk loose on the spindle, a clutch device between the spindle and disk comprising a pin and notch adapted to engage and disengage, a lever acted on by the spindle when moved lengthwise in one direction, a worm-wheel connected with the disk, a worm-shaft engaging the worm-wheel and by its rotation effecting the disengagement of the pin and notch and the lengthwise movement of the pointer-carrying spindle, and means for stopping the action of the meter and the index mechanism when the pin engages the notch, substantially as described.

3. In a gas-meter index mechanism, the combination of the rotary lengthwise-movable pointer-carrying spindle, a disk loosely journaled on the spindle, a pin-and-notch clutch device for connecting and disconnecting the spindle and the disk, and a pivoted lever controlled by the lengthwise movement of the spindle for stopping and starting the meter and index mechanism, substantially as described.

4. In a gas-meter index mechanism, the combination, with the registering and adjustable pointers, of a rotary lengthwise-movable spindle connected with the registering-pointer, a rotary disk loosely journaled on the spindle and connected with the adjustable pointer, a pin-and-notch clutch device for connecting and disconnecting the spindle and disk, means for rotating the disk to disengage the pin and notch and move the spindle lengthwise, a pivoted lever operated by the lengthwise movement of the spindle, a sliding arm moved by the lever and having a cross-piece provided with a pin, and a guide in which move the sliding arm and the pin on the cross-piece for stopping the meter and the index mechanism, substantially as described.

In testimony whereof I have hereunto signed name in the presence of two subscribing witnesses.

WILLIAM ANDREW McINTOSH VALON.

Witnesses:
   OWEN F. DANIEL,
     *Notary Public.*
   H. M. TUCKER,
     *His Clerk.*